US007450842B2

(12) United States Patent
Ito et al.

(10) Patent No.: US 7,450,842 B2
(45) Date of Patent: Nov. 11, 2008

(54) MANUFACTURING METHOD OF COLOR CATHODE RAY TUBE

(75) Inventors: Yoichi Ito, Mobara (JP); Satoshi Muto, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 342 days.

(21) Appl. No.: 11/341,716

(22) Filed: Jan. 27, 2006

(65) Prior Publication Data

US 2006/0171710 A1 Aug. 3, 2006

(30) Foreign Application Priority Data

Jan. 28, 2005 (JP) ............................ 2005-020646

(51) Int. Cl.
*G03B 41/00* (2006.01)

(52) U.S. Cl. ........................................ 396/546; 445/47

(58) Field of Classification Search ................. 396/549, 396/546; 313/364; 445/47

See application file for complete search history.

(56) References Cited

U.S. PATENT DOCUMENTS 6,091,191 A * 7/2000 Togawa ...................... 313/402
2005/0104494 A1* 5/2005 Yotani et al. ................. 313/2.1

* cited by examiner

*Primary Examiner*—Christopher Mahoney
*Assistant Examiner*—Autumn Parker
(74) *Attorney, Agent, or Firm*—Milbank, Tweed, Hadley & McCloy, LLP

(57) ABSTRACT

In an exposure step for forming a phosphor screen of a color cathode ray tube, correction lenses which are arranged between a light source and a panel are used in a state that a common correction lens which is used in common for three colors and three kinds of monochroic correction lenses are combined. The present invention can, in a flat-face-type color cathode ray tube, prevent the generation of the mislanding attributed to the difference in a wall thickness between a center portion and a peripheral portion of a panel thus improving the color purity.

2 Claims, 7 Drawing Sheets

MANUFACTURING METHOD OF COLOR CATHODE RAY TUBE

BACKGROUND OF THE INVENTION

1. Field of the Invention

The present invention relates to the manufacturing method of a color cathode ray tube, and more particularly to a flat-face type color cathode ray tube which has an outer surface of a panel portion thereof formed into an approximately flat shape.

2. Description of the Related Art

A color cathode ray tube, for example, a color cathode ray tube which is used in a color television set, a color display monitor for an OA equipment terminal includes a vacuum envelope. The vacuum envelope is constituted of an approximately rectangular panel portion which has a phosphor screen including a black matrix (BM) film or a large number of dot-like or stripe-like phosphor pixels on an inner surface thereof, an approximately cylindrical-shape neck portion which houses an electron gun therein, and an approximately funnel portion which connects the neck portion and the above-mentioned panel portion on an axis which is substantially coaxial with a tube axis and includes a deflection yoke on an outer periphery of a transitional region between the neck portion and the panel portion. Further, in the inside of the vacuum envelope, a shadow mask which constitutes a color selection electrode and includes a large number of electron beam apertures is arranged in the vicinity of the phosphor screen in an opposed manner.

This shadow mask uses an aluminum killed steel as a main constituting material thereof. Further, with respect to the shadow mask, along with a recent demand for high definition of the color cathode ray tube, a shadow mask having a small plate thickness has been used. In a color cathode ray tube which adopts the small-plate-thickness shadow mask, a phenomenon in which a portion of the shadow mask is deformed by heat so that an electron beam spot is displaced from a given position on a phosphor screen during a displaying operation, that is, a so-called mask doming phenomenon is liable to easily occur.

As a means to cope with such a phenomenon, along with the improvement of a shadow mask suspension mechanism, a nickel steel alloy of FeNi36 is also used as the constitutional material in view of the thermal expansion coefficient and the physical hardness.

Such a shadow mask is formed as follows. A form in which a large number of electron beam apertures are formed at given positions by etching is blanked in a given shape. Thereafter, the blanked form is formed into a shape using a press such that the shadow mask is constituted of an approximately spherical main surface and a skirt portion which is contiguously formed with a periphery of the main surface and is bent by approximately 90 degrees with respect to the main surface and is used.

Further, recently, along with the popularization of a color television set or a color display monitor having a flat screen type, there is observed a tendency that an outer surface of a faceplate (panel glass) is leveled or flattened with respect to the color cathode ray tube which is used in the color television set and the color display monitor.

FIG. 8 is a schematic cross-sectional view for explaining a constitutional example of a shadow-mask-type color cathode ray tube of a flat panel type. In FIG. 8, a vacuum envelope is constituted of a panel portion 51 which forms a phosphor screen 50 having a black matrix film which consists of phosphor pixels and a non-light-emitting light absorbing material layer on an inner surface thereof, a neck portion 52 which houses an electron gun 61, and a funnel portion 53 which connects the panel portion 51 and the neck portion 52.

The panel portion 51 includes an approximately flat outer surface and a concavely curved inner surface. The phosphor screen 50 which is arranged on the inner surface of the panel portion 51 includes, in general, phosphor pixels which are formed by applying phosphors of three colors of red (R), green (G), blue (B) respectively in a dotted pattern or in a stripe pattern, a black matrix film which surrounds the phosphor pixels and is made of a non-light-emitting light absorption material layer such as carbon, and a metal reflection film which constitutes a metal back layer. Further, a shadow mask 54 is arranged close to the phosphor screen 50. The shadow mask 54 is formed of a nickel steel alloy of FeNi36 by taking a thermal expansion coefficient and a physical hardness into consideration.

The shadow mask 54 is of a self-standing shape-holding type which is formed by a press, wherein a periphery of the shadow mask 54 is welded to a mask frame 57, and the shadow mask 54 is suspended and supported on stud pins 60 which are mounted upright on an inner wall of a skirt portion of the panel portion 51 by way of suspension springs 59. Here, a magnetic shield 58 is fixed to an electron-gun-61-side of the mask frame 57. A deflection yoke 55 is exteriorly mounted on a transitional region between the neck portion 52 and the funnel portion 53 of the vacuum envelope, wherein by deflecting three modified electron beams B which are irradiated from the electron gun 61 in the horizontal direction (X direction) and the vertical direction (Y direction), the electron beams B are scanned two-dimensionally on the phosphor screen 50 thus reproducing an image.

Further, an inner conductive film 62 which is formed on an inner surface of the funnel portion 53 applies a high voltage introduced from an anode button to electrodes which form a main lens of the electron gun 61 and a metal reflection film of the phosphor screen 50. Numeral 63 indicates a reinforcing band, numeral 64 indicates a mouthpiece, and numeral 65 indicates a whole color cathode ray tube.

In the color cathode ray tube having such a constitution, as described previously, the panel portion 51 has the approximately flat outer surface and the concavely curved inner surface. To the contrary, the shadow mask 54 is shaped into the given curved surface by molding the shadow mask form by a press and is curved in conformity with the inner surface of the panel portion 51.

The reason that the inner surface of the panel portion 51 and the shadow mask 54 are curved irrespective of the approximately flat external surface of the panel portion 51 is that the manufacturing method of the shadow mask 54 by a press forming technique can be performed easily and at a low cost.

The curved shape of the shadow mask 54 is a aspherical shape in which radii of curvature are gradually decreased from the center of a main surface to a periphery of the shadow mask 54 respectively along a long axis, a short axis and a diagonal line of the shadow mask 54. The curvatures of the shadow mask 54 of the aspherical shape are determined as follows, for example, wherein an equivalent radius of curvature is set as Re.

$$Re=(z^2+e^2)/2z$$

Here, e: a distance (mm) in the direction orthogonal to a tube axis from the center to an arbitrary peripheral position on a main surface of the shadow mask z: a falling quantity (mm) in the tube axis direction from the center of the main surface of the shadow mask at the above-mentioned arbitrary peripheral position Such specification establishes the compatibility between a flat feeling of the screen and the maintenance of a mechanical strength of the shaped shadow mask as the color cathode ray tube FIG. 9 is a schematic cross-sectional view showing a portion of an essential part of the color cathode ray tube shown in FIG. 8 in an enlarged manner. In FIG. 9, the phosphor screen 50 formed on the inner surface of the panel portion 51 includes three-color phosphor pixels 501 which are formed by applying phosphors of three colors in a dotted pattern or a stripe pattern, a black matrix film 502 which surrounds the phosphor pixels 501, and a metal reflection film 503, wherein the shadow mask 54 is arranged close to the phosphor screen 50 in a state that the shadow mask 54 faces the phosphor screen 50 in an opposed manner.

The three-color phosphor pixels 501 are constituted of a red (R) phosphor pixel 501R, a green (G) phosphor pixel 501G and a blue (B) phosphor pixel 501B. The phosphor pixels 501 are formed on opening portions (window portions) formed in the black matrix film 502 through an exposure step after applying a phosphor slurry on an inner surface of the panel portion on which the black matrix film 502 is formed. The exposure step is performed for every color. Since positions of three light sources 66G, 66B, 66R are different from each other, it is possible to accurately form three kinds of phosphor pixels on the opening portions (window portions) formed in the black matrix film 502 respectively.

In forming the black matrix film 502, a photoresist in a slurry form is applied to the inner surface of the panel portion and, thereafter, the photoresist is exposed, and the photoresist is removed except for photosensitive portions. Then, graphite is applied to the inner surface of the panel portion and the photosensitive portions of the photoresist are removed thus forming opening portions for forming phosphor layers in the black matrix film. In the exposure step for forming the black matrix film, the exposure is performed three times by changing the positions of the light source for forming the opening portions for green phosphors, the opening portions for blue phosphors and the opening portions for red phosphors.

An example of a conventional exposure device is shown in FIG. 10. The exposure device shown in FIG. 10 is an exposure device disclosed in FIG. 2 of patent document 1, that is, patent publication number JP-A-11-167864, wherein numerals used in the drawing are used as it is. In FIG. 10, numeral 1 indicates a panel, numeral 3 indicates a shadow mask, numeral 5 indicates a device body, numeral 6 indicates a light source, numeral 7 indicates a slide mechanism, numeral 8 indicates a first correction lens, numeral 9 indicates a mounting position of two auxiliary correction lenses, numeral 9*a* indicates a first auxiliary correction lens, numeral 9*b* indicates a second auxiliary correction lens, numeral 10 indicates an auxiliary correction lens storing chamber, numeral 10*a* indicates an accommodating shelf, numeral 10*b* indicates an elevating mechanism, numeral 10*c* indicates a pullout opening, numeral 11 indicates an auxiliary correction lens rotational drive mechanism, and numeral 12 indicates a second correction lens. According to the explanation of patent document 1, there is disclosed a manufacturing device in which the second correction lens 12 is constituted of a curved-surface type glass having a correction component parallel to the X direction and corrects only components of the positional displacement of the respective phosphor stripes of three colors which are generated during the manufacturing steps and hence, the manufacturing device can correct the positional displacement components which are generated during the manufacturing steps at a low cost coupled with a correction effects of the above-mentioned first correction lens 8.

Further, FIG. 11 shows another example of the conventional exposure device. The exposure device shown in FIG. 11 is an exposure device which is disclosed in FIG. 1 of patent document 2, that is, patent publication number JP-A-2000-268719, wherein numerals are used as it is. In FIG. 11, numeral 1 indicates a light source, numeral 2 indicates a lens system including correction lenses, numeral 3 indicates a main base, numeral 4 indicates a support member, numeral 105 indicates a panel, numeral 106 indicates a panel mounting base, numeral 107 indicates a panel transport base, and numeral 108 indicates a color selection electrode. The lens system 2 includes three sets of lens systems for the R exposure, the G exposure and the B exposure, wherein the lens system 2 is constituted of a flat plate "n" for three colors and correction lenses for respective colors. According to the explanation of this patent document 2, by preparing the respectively independent correction lenses for three colors which are small in use number, it is possible to approximate an optical path from a light source to a panel surface to trajectories of electron beams and hence, it is possible to manufacture a color cathode ray tube with little color slurring compared to the related art.

In the flat panel type color cathode ray tube shown in FIG. 8 in which the panel portion has the approximately flat outer surface, a wall thickness of the panel portion differs between a center portion and a peripheral portion. To reduce a distortion of a screen generated due to the difference in the wall thickness of the panel portion, there has been proposed a novel deflection yoke which has characteristics different from the characteristics of the related art.

Further, in the formation of a phosphor screen of a conventional cathode ray tube having a shape in which the above-mentioned panel wall thickness is substantially equal over a whole panel surface, a system which combines a rotary body lens which reduces the undulation of stripes with a landing correction lens is adopted.

SUMMARY OF THE INVENTION

However, when the formation of the phosphor screen of the flat-panel-type color cathode ray tube which mounts the above-mentioned novel deflection yoke thereon is performed in a method which is substantially equal to the above-mentioned method, a curved shape of the correction lens which is used at the time of exposure becomes steep and hence, it is difficult to ensure the manufacturing accuracy of lenses and, at the same time, the fluctuation of characteristics among the manufactured individual lenses becomes large. Further, a manufacturing cost of lenses is also pushed up and hence, the assurance of correction lenses per se becomes difficult. In this manner, there has been a drawback that it is difficult to manufacture a color cathode ray tube which exhibits the excellent color purity by reducing mislanding.

To overcome the above-mentioned drawbacks, according to the present invention, a correction lenses which are used at the time of performing the exposure for forming a phosphor screen are formed by combining a common correction lens which is common in three colors consisting of R, G, B and monochroic correction lenses for respective colors.

According to the present invention, it is possible to obtain outstanding advantageous effects such as the use of correction lenses having high accuracy, the prevention of the generation of mislanding, the assurance of a large correction quantity by arranging the common correction lens closer to a panel inner surface side than the monochroic correction lenses, the acquisition of a high quality color cathode ray tube which exhibits the excellent color purity by preventing the generation of mislanding and the like.

Further, according to the present invention, it is also possible to obtain outstanding advantageous effects such as the assurance of a dense and large correction quantity due to the combination of the correction lenses with the correction filters, the prevention of the generation of mislanding, the proper setting of the arrangement positions, profile sizes and the correction quantity, the acquisition of the high-quality color cathode ray tube which exhibits the excellent color purity by preventing the generation of mislanding and the like.

BRIEF DESCRIPTION OF DRAWINGS

FIG. 4A, FIG. 4B and FIG. 4C are views showing examples of monochroic local correction filters of the present invention, wherein FIG. 4A and FIG. 4C are schematic plan views of the local correction filters for side beams and FIG. 4B is a schematic plan view of the local correction filter for center beams;

DESCRIPTION OF THE PREFERRED EMBODIMENTS

Hereinafter, preferred embodiments of the present invention are explained in detail in conjunction with drawings which show the embodiments.

Embodiment 1

A color cathode ray tube is constituted of a panel portion which includes a phosphor screen on which a black matrix film having a plurality of opening portions and three kinds of phosphor pixels which are arranged in the opening portions of the black matrix are formed on an inner surface thereof, and a shadow mask which is arranged to face the phosphor screen formed on the inner surface of the panel portion in an opposed manner and includes a large number of electron beam apertures.

Figure 1:
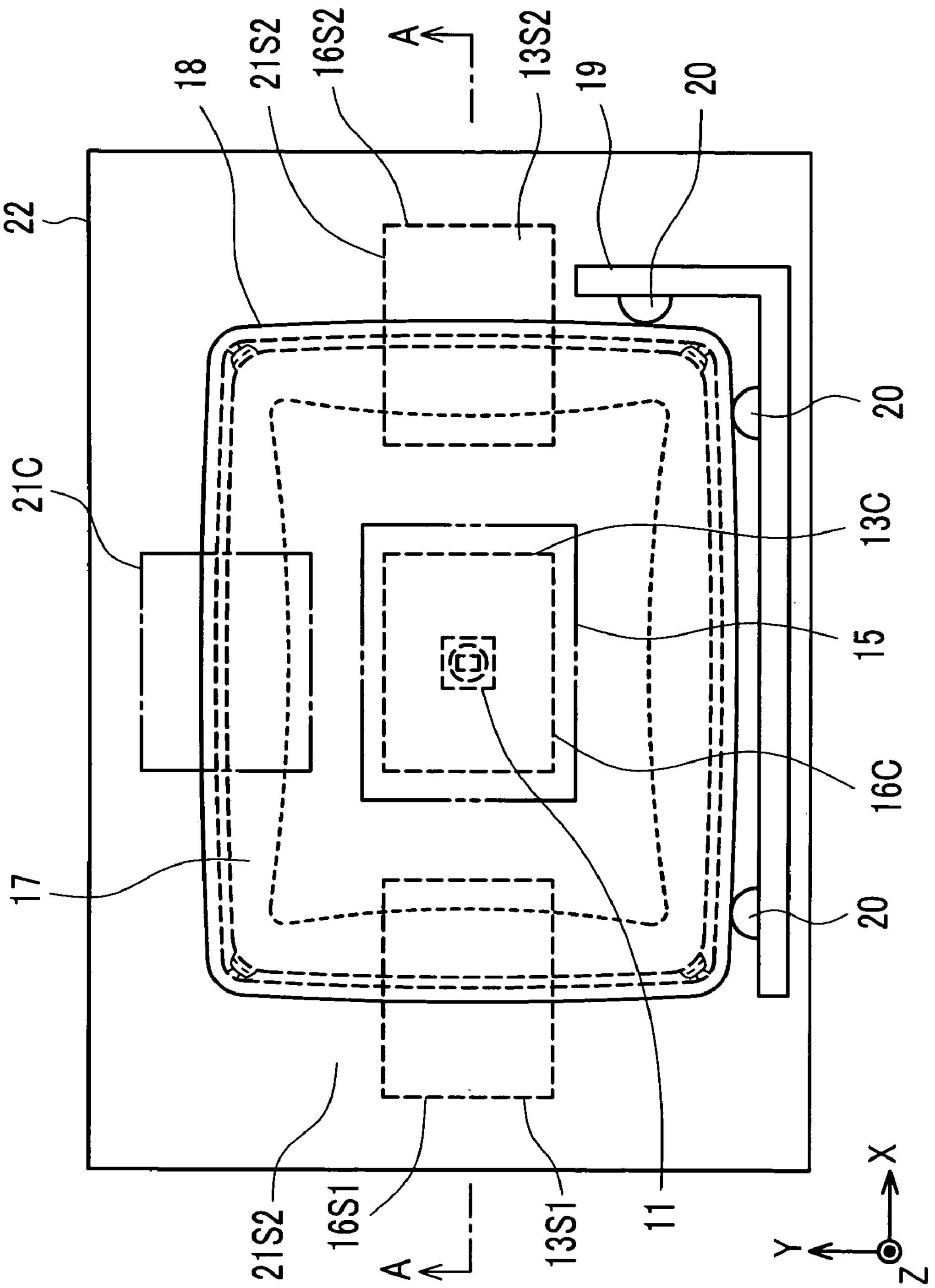
FIG. 1 is a schematic plan view showing an example of an exposure device for explaining a method for manufacturing a color cathode ray tube according to the present invention.
Figure 2:
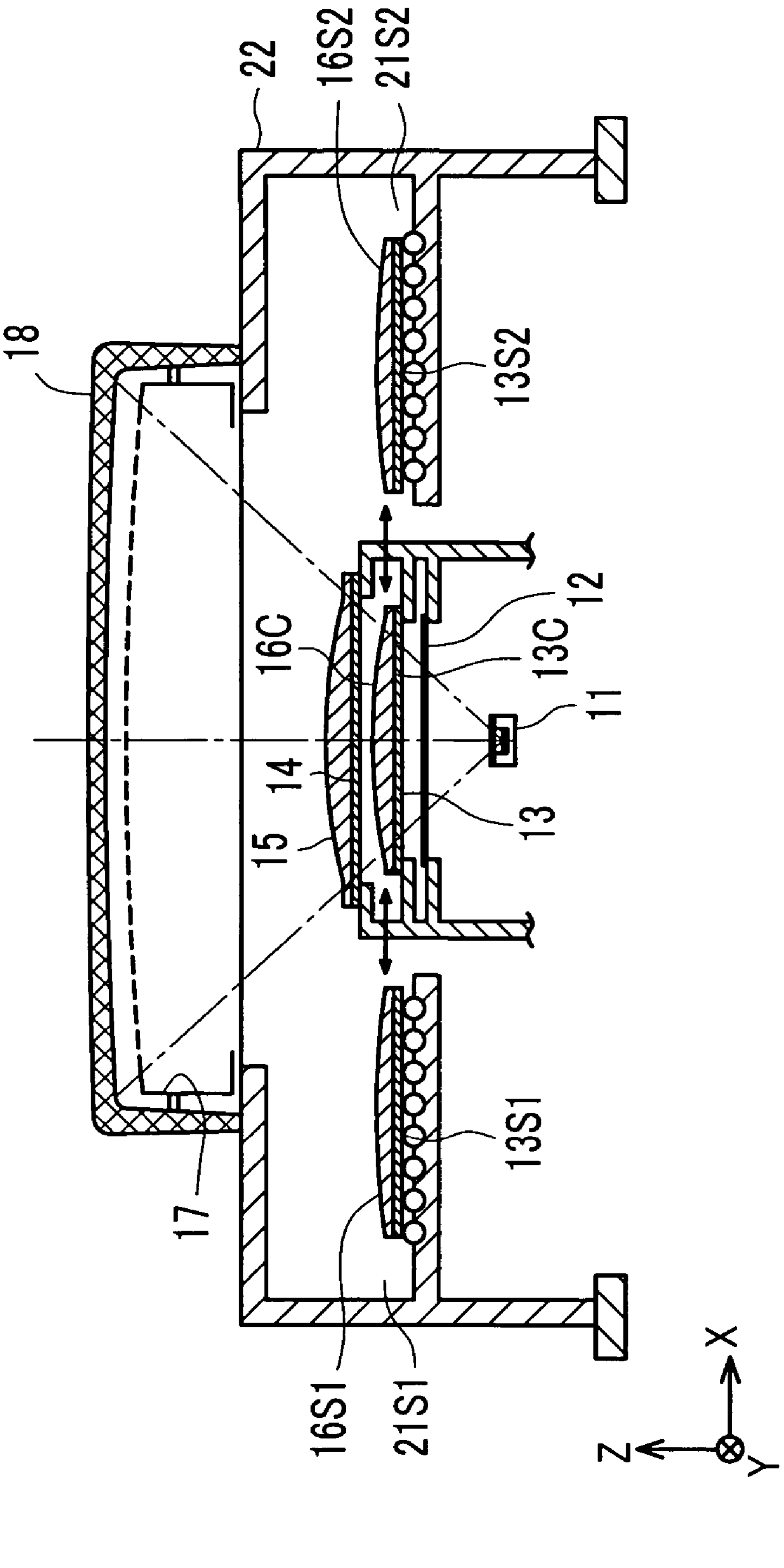
FIG. 2 is a cross-sectional view taken along a line A-A in FIG. 1.

FIG. 1 and FIG. 2 are views for explaining a manufacturing method of a color cathode ray tube of the present invention, wherein FIG. 1 is a schematic plan view showing an example of an exposure device and FIG. 2 is a cross-sectional view taken along a line A-A in FIG. 1. In FIG. 1 and FIG. 2, numeral 11 indicates an exposure light source, numeral 12 indicates a grading filter, numeral 13 (13C, 13S1, 13S2) indicates monochroic local correction filters for respective colors of phosphor layer, numeral 14 indicates a multi-color local correction filter, numeral 15 indicates a common correction lens, numeral 16 indicates a plurality of monochroic correction lenses, numeral 17 indicates a shadow mask, numeral 18 indicates a panel portion, numeral 19 indicates a panel positioning jig, numeral 20 indicates projections, numeral 21 indicates a storing chamber, and numeral 22 indicates a device body.

The phosphor screen having a given pattern is formed such that the panel portion 18 which mounts the shadow mask 17 on the inner side thereof is brought into contact with projections 20 of the panel positioning jig 19 formed on the device body 22 and the phosphor screen is exposed with the light from the exposure light source 11.

In this embodiment, the flat-face-type panel portion 18 which has the approximately flat outer surface and has a larger wall thickness at a peripheral portion thereof compared to a wall thickness of a center portion thereof is used.

Particularly, the step for forming the black matrix film comprises an exposure step of first phosphor pixel holes, an exposure step of second phosphor pixel holes, and an exposure step of third phosphor pixel holes. In the exposure step of the first phosphor pixel holes, the exposure is performed by arranging a common correction lens 15 and the first monochroic correction lens 16C between the inner surface of the panel portion and the exposure light source. In the exposure step of the second phosphor pixel holes, the exposure is performed by arranging the common correction lens 15 and the second monochroic correction lens 16S1 between the inner surface of the panel portion and the exposure light source. In the exposure step of the third phosphor pixel holes, the exposure is performed by arranging the common correction lens 15 and the third monochroic correction lens 16S2 between the inner surface of the panel portion and the exposure light source.

The common correction lens 15 is used in common in the exposure steps of the first phosphor pixel holes, the second phosphor pixel holes and the third phosphor pixel holes. A profile of a lens forming portion which constitutes an effective region of the common correction lens 15 has a rectangular shape. The common correction lens 15 is formed in a left-and-right symmetry with respect to a longitudinal axis (Y axis) of the common correction lens 15, and is formed in an up-and-down symmetry with respect to a lateral axis (X axis) of the common correction lens 15. Further, the holes of the green phosphor pixels are exposed in the exposure step of the first phosphor pixel holes, the holes of the blue phosphor pixels are exposed in the exposure step of the second phosphor pixel holes, and the holes of the red phosphor pixels are exposed in the exposure step of the third phosphor pixel holes.

In this embodiment, in performing the exposure, the exposure is performed by interposing, in combination, a plurality of correction filters consisting of the common correction lens 15 which is used in common in exposures performed three times as the correction lens, the monochroic correction lenses 16 (16C, 16S1, 16S2) which are used for respective exposures performed three times, the grading filter 12 which is used in common in exposures performed three times in which the optical transmissivity is changed between the center and the periphery as the correction filter, the monochroic local correction filter 13 which is used for every exposure with the correction of fixed transmissivity, and the common local correction filter 14 which is used in common in exposures performed three times with the fixed transmissivity correction thus forming a given pattern.

The monochroic correction lenses 16 for respective colors are constituted of a center-beam correction lens 16C and both side-beam correction lenses 16S1, 16S2 and these correction lenses are respectively used in combination with the position of the exposure light source 11. That is, in the center-beam exposure, the center-beam correction lens 16C which is retracted in a storing chamber 21C in the Y-axis direction is moved to a given position in the vicinity of a tube axis from the retracting position.

After the movement, the exposure is made by combining the center-beam correction lens 16C with the common correction lens 15, the grading filter 12, the common local correction filter 14 and the monochroic local correction filter 13C which are preliminarily arranged in place in the vicinity of tube axis. After the completion of the exposure, the center-beam correction lens 16C is retracted and stored in the storing chamber 21C and stands by in the storing chamber 21C.

On the other hand, both side-beam correction lenses 16S1, 16S2 are also respectively moved to the given positions in the vicinity of the tube axis from the respective storing chambers 21S1, 21S2 at the time of performing the side-beam exposure. After the movement, the exposure is made by combining both side-beam correction lenses 16S1, 16S2 with the common correction lens 15, the grading filter 12, the common local correction filter 14 and the monochroic local correction filters 13S1, 13S2 which are preliminarily arranged at the given position in the vicinity of the tube axis. After the completion of the exposure, the side-beam local correction filters 13S1, 13S2 are respectively retracted and stored in the storing chambers 21S1, 21S2 and stand by in the storing chambers 21S1, 21S2. In performing the respective exposures, the position of the light source is changed in the same manner as the related art.

Figure 3:
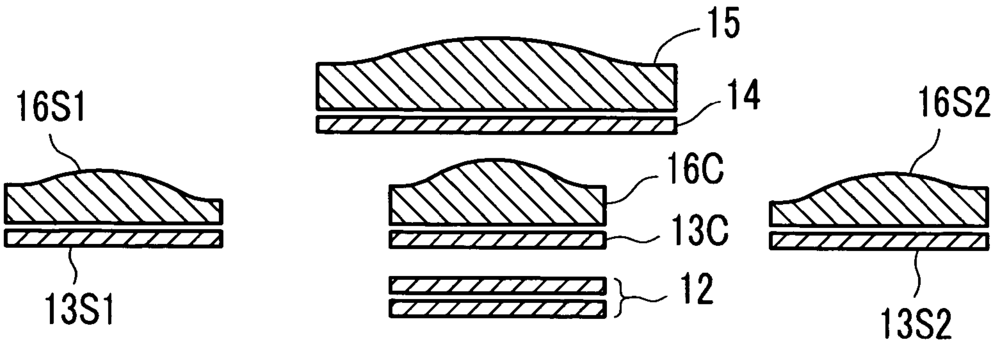
FIG. 3 is a schematic cross-sectional view showing an example of the combined constitution of correction lenses and correction filters of the present invention.
Figures 4A, 4B, 4C:
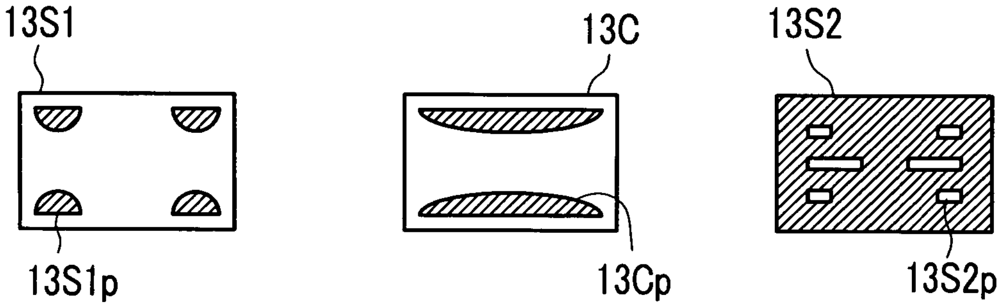
Figure 5:
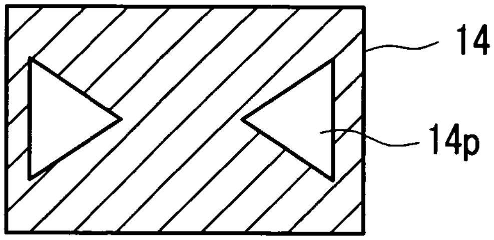
FIG. 5 is a schematic plan view showing an example of a common local correction filter of the present invention.
Figure 6:
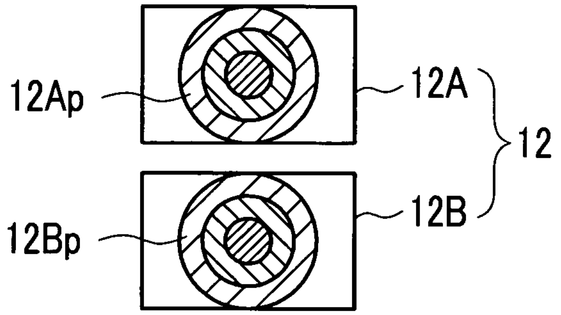
FIG. 6 is a schematic plan view showing an example of a grading filter of the present invention.

FIG. 3 to FIG. 6 show examples of the correction lens and the correction filter which are used in the method for manufacturing the color cathode ray tube of the present invention, wherein FIG. 3 is a schematic cross-sectional view showing one example of the combined constitution of the correction lenses and the correction filters. FIG. 4A to FIG. 4C are views showing monochroic local correction filters, wherein FIG. 4A and FIG. 4C are schematic plan views of the local correction filters for side beams and FIG. 4B is a schematic plan view of the local correction filter for center beams. FIG. 5 is a schematic plan view showing an example of the common local correction filter. FIG. 6 is a schematic plan view of the grading filter. In these respective views, parts identical with the parts shown in the above-mentioned drawings are given the same symbols.

In FIG. 3, the grading filter 12, the common local correction filter 14 and the common correction lens 15 are coaxially arranged. The grading filter 12, the common local correction filter 14 and the common correction lens 15 are used in all exposures performed three times. In forming the phosphors to which the center electron beams of the cathode ray tube are irradiated, the monochroic correction lens 16C and the monochroic local correction filter 13C are used. In forming the phosphors to which the first side electron beams of the cathode ray tube are irradiated, the first side monochroic correction lens 16S1 and the first side monochroic local correction filter 13S1 are used. In forming the phosphors to which the second side electron beams of the cathode ray tube are irradiated, the second side monochroic correction lens 16S2 and the second side monochroic local correction filter 13S2 are used.

FIG. 4A to FIG. 4C indicate examples of the correction patterns of the local correction filters 13, wherein the side-beam local correction filter 13S1 shown in FIG. 4A adopts a half-moon-shaped pattern 13S1*p* and another side-beam local correction filter 13S2 shown in FIG. 4C adopts a rectangular pattern 13S2*p*. Further, the center beam local correction filter 13C shown in FIG. 4B adopts an arcuate pattern 13C.

FIG. 5 shows an example of a correction pattern of the common local correction filter 14, wherein the common local correction filter 14 adopts a triangular pattern 14*p* having high transmissivity at both ends thereof in the X direction.

FIG. 6 shows examples of the correction patterns of the grading filter 12. The grading filter 12 is constituted of two grading filters 12A, 12B having approximately concentric patterns 12Ap, 12Bp which exhibit the lowest optical transmissivity at a center portion thereof and gradually increases the optical transmissivity in the direction toward a peripheral portion thereof.

According to the constitution of this embodiment 1, by allowing the correction lens to have the combined constitution of the multi-color correction lens 15 common in three colors and the monochroic correction lenses 16 for respective colors, it is possible to simultaneously realize the correction which is common in the exposures performed three times and the individual corrections performed for respective exposures thus manufacturing the color cathode ray tube of high quality which exhibits the excellent color purity by preventing the generation of the mislanding.

Embodiment 2

Figure 7:
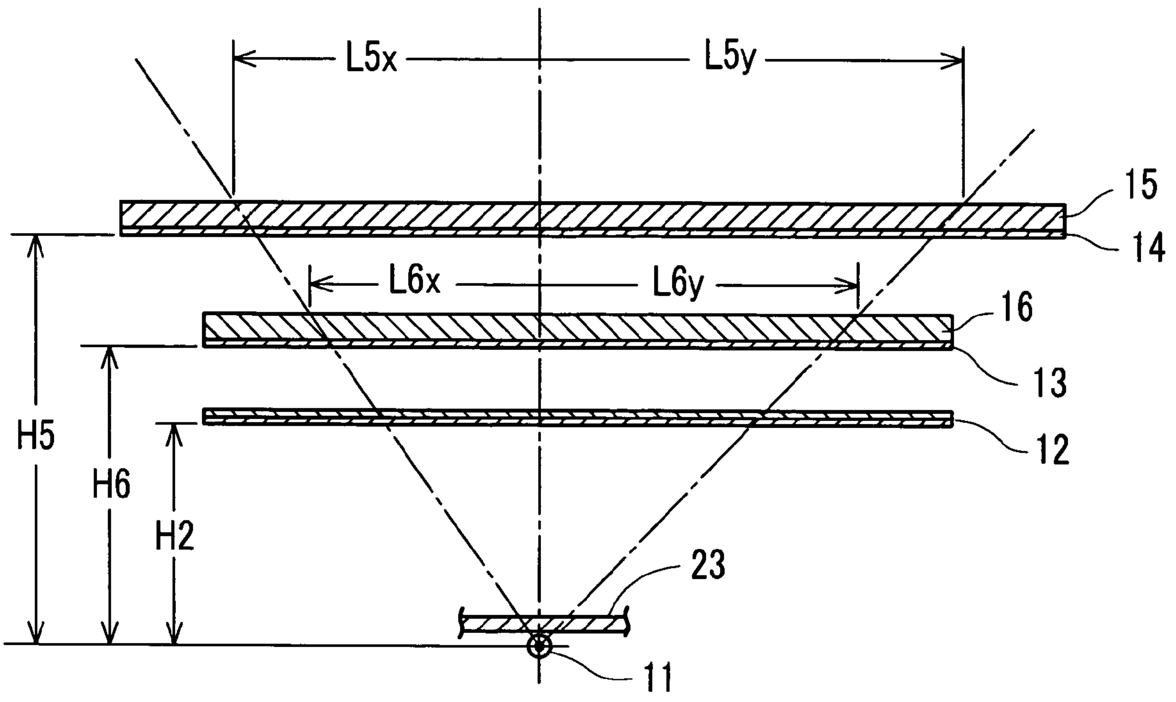
FIG. 7 is a schematic cross-sectional view showing another example of an exposure device for explaining the method for manufacturing a color cathode ray tube of the present invention.
Figure 8:
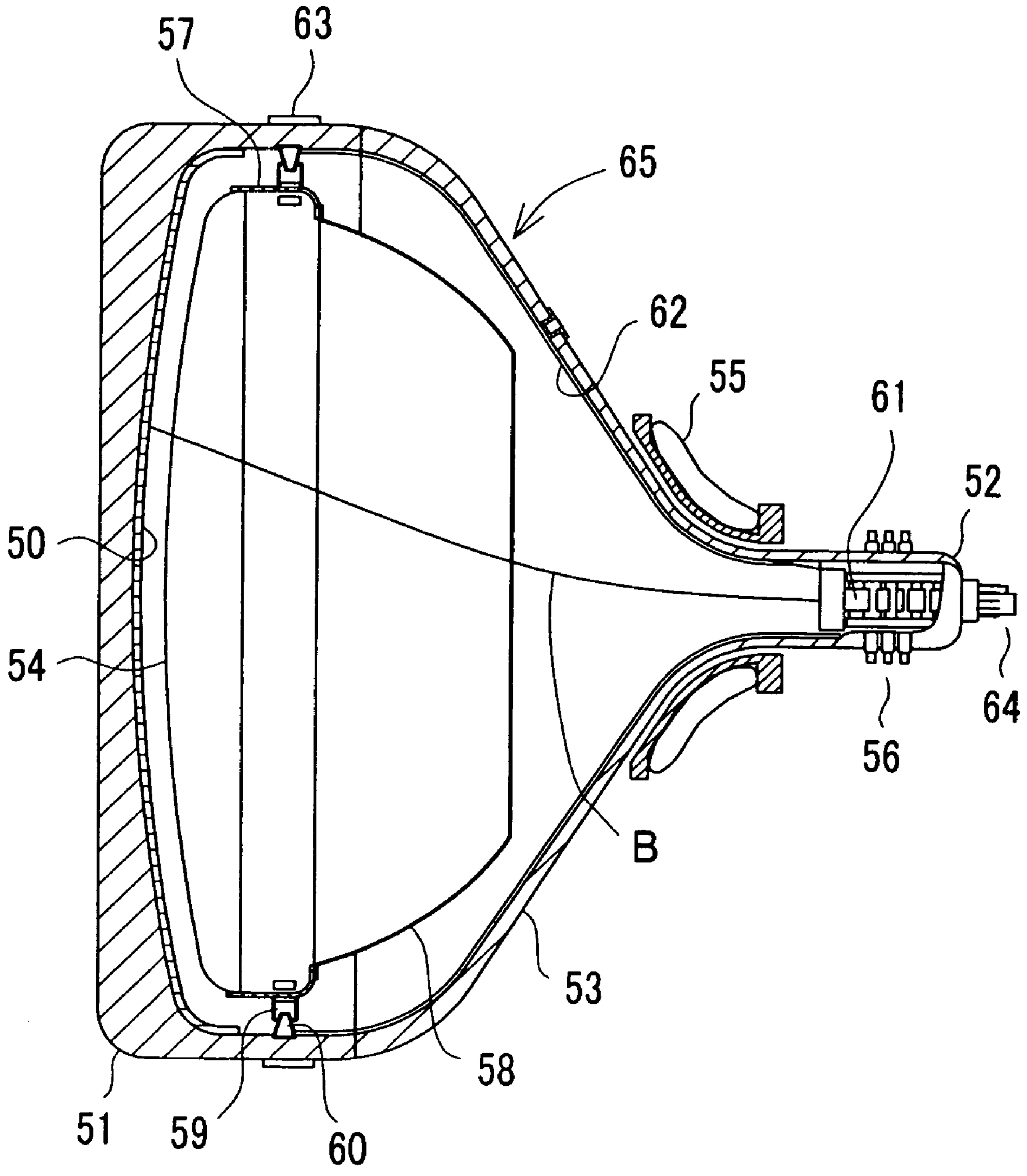
PRIOR ART FIG. 8
FIG. 8 is a schematic constitutional view for explaining the structure of a flat-face-type shadow-mask color cathode ray tube.
Figure 9:
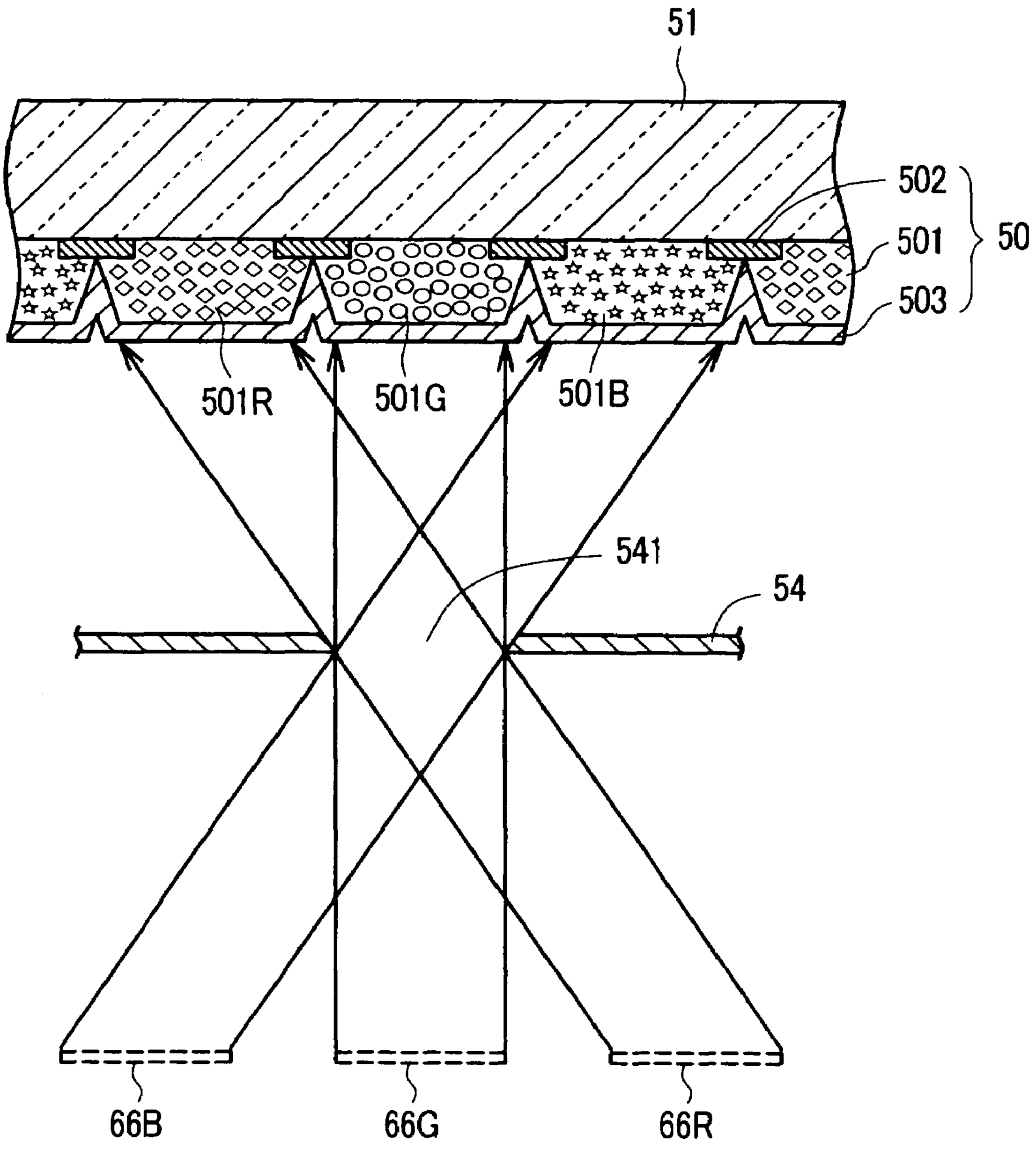
PRIOR ART FIG. 9
FIG. 9 is an enlarged cross-sectional view of an essential part in FIG. 8.
Figure 10:
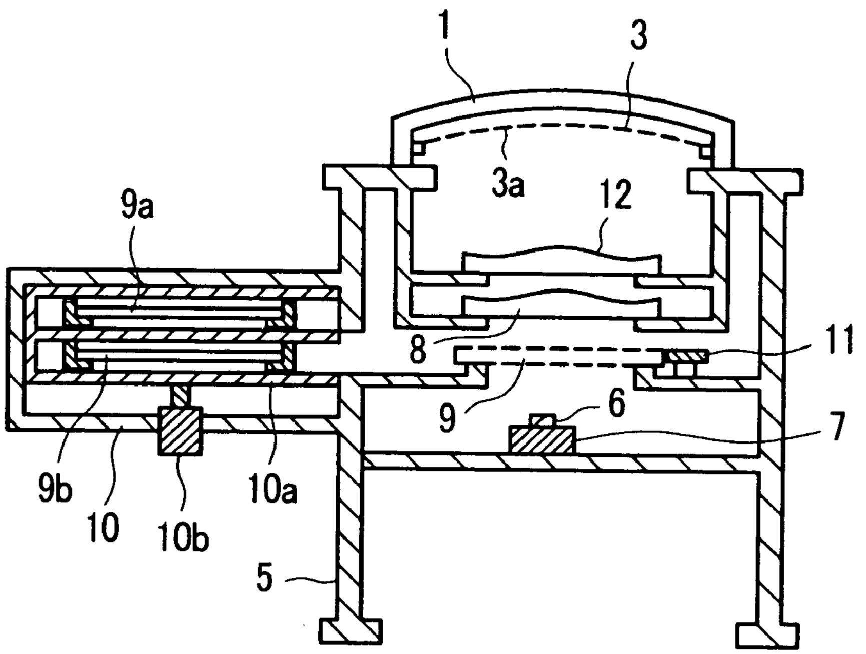
PRIOR ART FIG. 10
FIG. 10 is a schematic cross-sectional view showing an example of a conventional exposure device.
Figure 11:
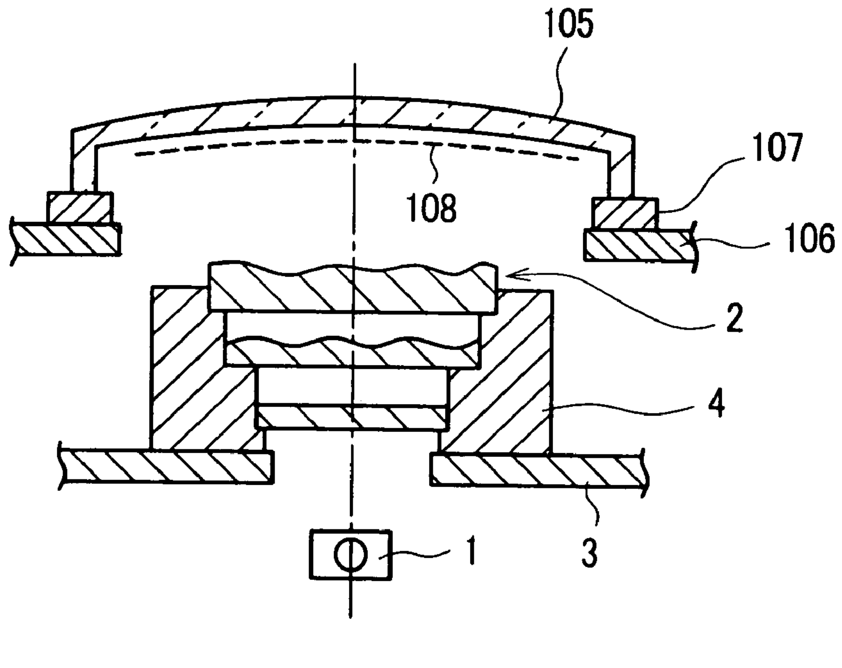
PRIOR ART FIG. 11
FIG. 11 is a schematic cross-sectional view showing another example of a conventional exposure device.

FIG. 7 is a schematic cross-sectional view showing another example of an exposure device for explaining the method for manufacturing the color cathode ray tube of the present invention, wherein parts identical with the parts shown in the above-mentioned drawings are given the same symbols. In FIG. 7, in performing the exposure of a flat-face-type panel which has an approximately flat outer surface and has a larger wall thickness at a peripheral portion thereof compared to a wall thickness of a center portion thereof, a distance between the light source 11 and the monochroic correction lens 16 at the time of performing the exposure is set to a distance H6. On the other hand, the common correction lens 15 is arranged closer to the panel portion 18 side than the above-mentioned monochroic correction lens 16 and the distance between the light source 11 and the common correction lens 15 is set to a distance H5 which is larger than the distance H6.

Further, the respective correction filters 15, 16 exhibit an approximately rectangular effective surface, wherein the common correction lens 15 is a lens having a curved surface which has a length L5Y in the Y-axis direction and a length L5X in the X-axis direction. Further, the monochroic correction lens 16 which has an oval lens compared to the common correction lens 15 is a lens having a curved surface which has a length L6Y in the Y-axis direction and a length L6X in the X-axis direction.

With respect to the curved surface shapes of the surfaces of the respective correction lenses, curved surface formulae are set in view of a phosphor screen size, a phosphor pixel pitch and the like. To describe a specific example of profile sizes, the order of arrangement, the sizes of arrangement and the like, in case of a 68 cm color cathode ray tube, first of all, the correction lenses are arranged in order of the monochroic correction lens 16 and the common correction lens 15 from the light source 11 side, wherein the respective sizes are set as H5: 100 mm, H6: 75 mm, L5Y: 110 mm, L5X: 75 mm, L6Y: 80 mm, L6X: 55 mm. In such arrangement and size, a size H2 between the grading filter 12 and the light source 11 is set approximately equal to a corresponding size in the conventional method. Here, symbol 23 indicates a glass plate attached to the light source device.

The step for forming the black matrix film comprises the exposure step of first phosphor pixel holes, the exposure step of second phosphor pixel holes, and the exposure step of third phosphor pixel holes. In the exposure step of the first phosphor pixel holes, the exposure is performed by arranging the common correction lens 15 and the first monochroic correction lens 16C having an outer diameter smaller than an outer diameter of the common correction lens 15 between the inner surface of the panel portion and the exposure light source. In the exposure step of the second phosphor pixel holes, the exposure is performed by arranging the common correction lens 15 and the second monochroic correction lens 16S1 having an outer diameter smaller than the outer diameter of the common correction lens 15 between the inner surface of the panel portion and the exposure light source. In the exposure step of the third phosphor pixel holes, the exposure is performed by arranging the common correction lens 15 and the third monochroic correction lens 16S2 having an outer diameter smaller than the outer diameter of the common correction lens 15 between the inner surface of the panel portion and the exposure light source.

The common correction lens 15 is used in common in the exposure step of the first phosphor pixel holes, in the exposure step of the second phosphor pixel holes and in the exposure step of the third phosphor pixel holes. The common correction lens performs the common correction in the exposures performed three times. Further, the respective monochroic correction lenses perform the individual corrections for respective colors. Since the correction component in common and the correction components for respective colors are separated from each other, it is possible to form the correction lenses with high accuracy and the proper beam landing can be easily achieved.

According to the constitution of the embodiment 2, by combining the sizes and the arrangement of the correction lenses, it is possible to prevent the generation of the mislanding thus enabling the manufacture of the high-quality color cathode ray tube which exhibits the excellent color purity.

The present invention is not limited to the above-mentioned embodiments and various modifications can be made without departing from the technical concept of the present invention.

What is claimed is:

1. A manufacturing method of a color cathode ray tube comprising a panel portion which includes a phosphor screen on which a black matrix film having a plurality of opening portions and three kinds of phosphor pixels which are arranged in the opening portions of the black matrix film are formed on an inner surface thereof, and a shadow mask which is arranged to face the phosphor screen formed on the inner surface of the panel portion and includes a large number of electron beam apertures, wherein a step for forming the black matrix film comprises an exposure step of first phosphor pixel holes, an exposure step of second phosphor pixel holes, and an exposure step of third phosphor pixel holes, in the exposure step of the first phosphor pixel holes, the exposure is performed by arranging a common correction lens and a first monochroic correction lens having an outer diameter smaller than an outer diameter of the common correction lens between the inner surface of the panel portion and the exposure light source, in the exposure step of the second phosphor pixel holes, the exposure is performed by arranging the common correction lens and a second monochroic correction lens having an outer diameter smaller than the outer diameter of the common correction lens between the inner surface of the panel portion and the exposure light source, and in the exposure step of the third phosphor pixel holes, the exposure is performed by arranging the common correction lens and a third monochroic correction lens having an outer diameter smaller than the outer diameter of the common correction lens between the inner surface of the panel portion and the exposure light source.

2. A manufacturing method of a color cathode ray tube comprising a panel portion which includes a phosphor screen on which a black matrix film having a plurality of opening portions and three kinds of phosphor pixels which are arranged in the opening portions of the black matrix film are formed on an inner surface thereof, and a shadow mask which is arranged to face the phosphor screen formed on the inner surface of the panel portion and includes a large number of electron beam apertures, wherein a step for forming the black matrix film comprises an exposure step of first phosphor pixel holes, an exposure step of second phosphor pixel holes, and an exposure step of third phosphor pixel holes, in the exposure step of the first phosphor pixel holes, the exposure is performed by arranging a common correction lens and a first monochroic correction lens between the inner surface of the panel portion and the exposure light source, in the exposure step of the second phosphor pixel holes, the exposure is performed by arranging the common correction lens and a second monochroic correction lens between the inner surface of the panel portion and the exposure light source, in the exposure step of the third phosphor pixel holes, the exposure is performed by arranging the common correction lens and a third monochroic correction lens between the inner surface of the panel portion and the exposure light source, and a lens forming portion of the common correction lens has a rectangular profile, the common correction lens is formed in a left-and-right symmetry with respect to a longitudinal axis of the common correction lens, and is formed in a up-and-down symmetry with respect to a lateral axis of the common correction lens.

* * * * *